United States Patent [19]
Schmid et al.

[11] Patent Number: 5,425,251
[45] Date of Patent: Jun. 20, 1995

[54] FABRIC TAKE-OFF ROLLER ARRANGEMENT FOR FLAT BED KNITTING MACHINES

[75] Inventors: Franz Schmid, Bodelshausen; Günther Kazmaier, St. Johann-Ohnastetten, both of Germany

[73] Assignee: H. Stoll GmbH & Co., Reutlingen, Germany

[21] Appl. No.: 165,501

[22] Filed: Dec. 13, 1993

[30] Foreign Application Priority Data

Dec. 18, 1992 [DE] Germany .................. 42 42 969.2

[51] Int. Cl.⁶ .............................................. D04B 15/90
[52] U.S. Cl. .................................... 66/149 R; 66/152; 226/181; 226/190; 492/40
[58] Field of Search .............. 66/149 R, 150, 152; 226/181, 190; 492/39, 40

[56] References Cited

U.S. PATENT DOCUMENTS

| | | | |
|---|---|---|---|
| 1,052,403 | 2/1913 | Becker, Jr. | 492/40 X |
| 4,121,440 | 10/1978 | Humbert | 66/152 |
| 4,478,058 | 10/1984 | Kazmaier et al. | 66/149 R |
| 4,481,795 | 11/1984 | Goller et al. | 66/150 |
| 4,777,808 | 10/1988 | Kuhnert | 66/149 R |
| 4,790,152 | 12/1988 | Geitner | 66/149 R |

FOREIGN PATENT DOCUMENTS

| | | |
|---|---|---|
| 695087 | 8/1940 | Germany . |
| 745182 | 2/1944 | Germany . |
| 2000211 | 2/1972 | Germany . |
| 2110079 | 9/1972 | Germany . |
| 2912990 | 10/1980 | Germany . |
| 3313554A1 | 10/1983 | Germany . |
| 0351511 | 1/1990 | Germany . |

*Primary Examiner*—John J. Calvert
*Attorney, Agent, or Firm*—Jones, Tullar & Cooper

[57] ABSTRACT

A fabric take-off roller arrangement for flat bed knitting machines is provided with a driven fabric take-off roller that has roller elements disposed next to each other in the axial direction. To ensure that, even with irregular thickenings of the fabric to be taken off, engagement of the fabric take-off roller arrangement is provided both in the region of the thickening and in the adjacent region(s) of the fabric to be taken off, it is provided that the roller elements engage one another in a co-rotational manner at their ends facing one another and are rotatably held on respectively one support carrier, that the support carriers are pivotably held in a direction perpendicular to the orientation of the roller elements that the ends of the roller elements facing each other are flexibly seated against each other as well as in the support carrier, and that the fabric take-off roller is pressed against a counter-roller, between which rollers the fabric run is taken off.

9 Claims, 2 Drawing Sheets

FABRIC TAKE-OFF ROLLER ARRANGEMENT FOR FLAT BED KNITTING MACHINES

FIELD OF THE INVENTION

The present invention relates to a fabric take-off roller arrangement, particularly for flat bed knitting machines, having two fabric take-off rollers which are preferably both driven and disposed parallel, wherein at least one of the fabric take-off rollers is pressed against the other fabric take-off roller, and the fabric run to be taken off is guided tangentially between fabric take-off rollers.

BACKGROUND OF THE INVENTION

Fabric take-off roller arrangements of this type for flat bed knitting machines are known from German Patent Publication DE 33 13 554 C2 and German Patent DE-PS 745 182. In both cases, both take-off rollers are embodied rigidly and in one piece, and in the latter-cited patent, one of the take-off rollers is seated to be resiliently flexible at one end.

With a fabric take-off roller arrangement of this type, a constant fabric take-off is provided, even with varying fabric run widths; however, problems arise where the knit fabric or fabric run has irregular thicknesses of thickenings, which cause one of the rollers to be deflected in the radial direction. With the known fabric take-off roller arrangements, it is not ensured that the rollers will continue to be in contact with the fabric run essentially along their entire length, as before, because with two rigid rollers it can occur that when the one roller is deflected due to thickenings in the knit fabric, the adjacent roller no longer engages, or does not engage entirely.

OBJECT AND SUMMARY OF THE INVENTION

The object of the present invention, therefore, is to provide a fabric take-off roller arrangement, particularly for flat bed knitting machines, of the type noted above, with which it is ensured that contact of the fabric take-off roller arrangement is provided both in the vicinity of the thickening and in the adjacent area(s) of the fabric to be taken off, even with irregular thickenings in the fabric to be taken off.

To attain this object, the present invention is characterized in that at least one of the fabric take-off rollers is formed by roller elements disposed next to each other in the axial direction; in that the roller elements engage one another, rotatably connected, at their ends facing each other, and are rotatably held on respectively one support carrier; in that the support carriers are pivotably held in a direction that is perpendicular to the orientation of the roller elements, and the roller elements are pressed in an individually adjustable manner against the other fabric take-off roller; and in that the ends of the roller elements that face each other are flexibly seated against each other as well as in the support carrier.

By means of the provisions in accordance with the present invention, it is possible that, with the occurrence of a thickening in the knit or fabric to be taken off, each of the roller elements can yield in such a way that at least the adjacent roller elements remain in contact with the knit fabric. Thus, it is ensured that a radial deflection of the take-off roller only occurs in a narrowly defined area around the occurring thickening(s). Moreover, the magnitude of the pressure counter to the other take-off roller can be selected for each roller element.

A structurally simple and reliable rotational driving of the individual roller elements among and with each other is provided by having the facing ends of the roller elements provided with claws that engage each other next to each other, of which at least the claws at one end are two-dimensionally spherical, at least on their surfaces adjacent to the claws of the other end.

The flexible seating of the roller elements in the carrier support is disclosed in an advantageous manner by means of which the roller elements are two-dimensionally spherical on the surfaces of their claws that rest against a receptacle of the support carrier.

Roller elements having a center shaft with a longitudinal stop are provided to secure the individual roller elements against one another in the axial direction and to prevent them from deflecting from one another in the axial direction.

In an advantageous manner, the support carrier is provided with a radial roller bearing disposed inside the roller elements and in whose inner ring the ends of the roller elements are received. The roller elements are not grasped along their outer circumference, but along their inner circumference via the roller bearings. In this case, at least one support carrier is provided with a radial roller bearing for each roller element, the roller bearings being disposed inside of its respective roller element, and defining an inner ring which receives the ends of adjacent respective roller elements. Thus, connection between the roller bearings and the pivotable suspension, are provided in a useful manner.

It would be possible to suspend the support carriers individually, each on one stationary component of the flat bed knitting machine. However, the at least one support carrier is provided with an approximately semicircular disk for each radial roller bearing, which is securely connected at one end to a bearing sleeve and at its other end to the outer ring of its respective radial roller bearing, each approximately semicircular disk extending through a gap formed between adjacent roller elements. As a result, a common, rigid shaft is provided for the pivotable seating in an advantageous manner.

In accordance with a preferred exemplary embodiment of the present invention, a rigid shaft extends parallel to the longitudinal extension of the take-off rollers, with at least one support carrier being pivotably suspended from the rigid shaft, so that each support carrier is provided with an individually adjustable clamping unit.

The pressing means includes an adjustable clamping nut for adjusting the pressing force applied to the at least one support carrier, so that with the fabric take-off roller arrangement of the invention, not only the takeoff roller is limited in its deflection when the counter-roller is pivoted away.

Further details of the invention are to be taken from the following description, in which the invention is described in more detail and explained in conjunction with the drawings.

DETAILED DESCRIPTION OF THE PREFERRED EMBODIMENT

Figure 1:
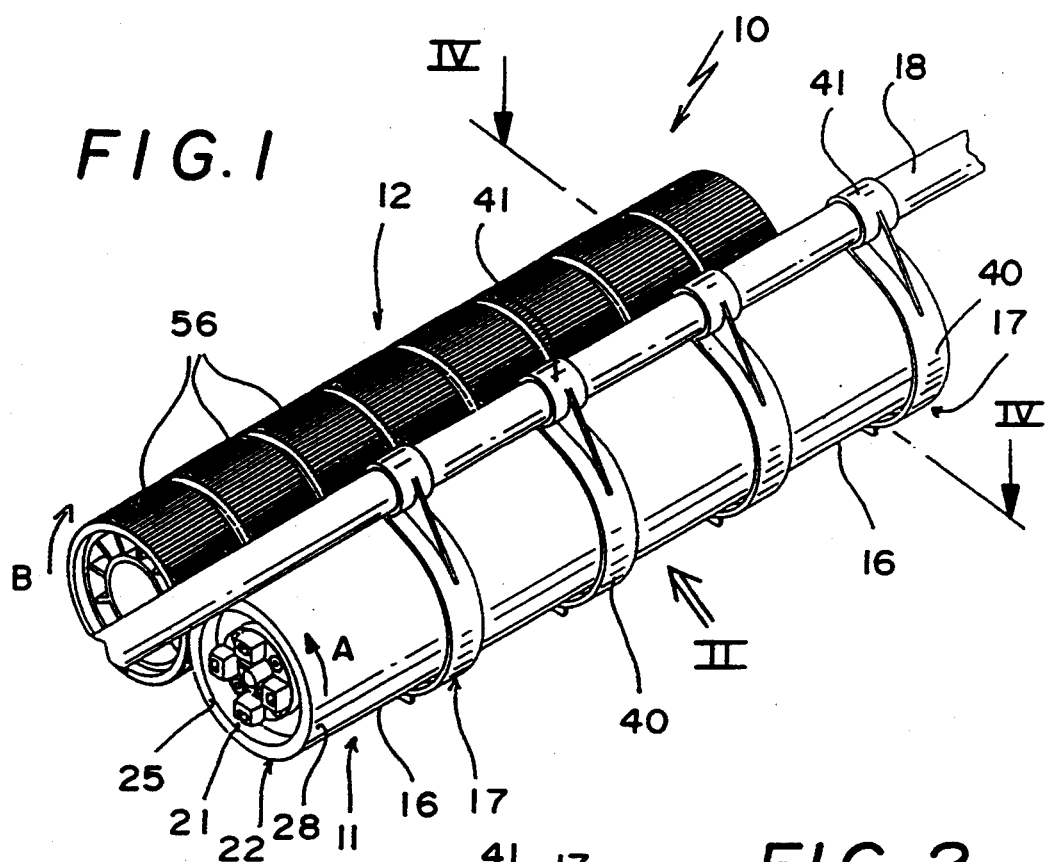
FIG. 1 is a representation in perspective of a fabric take-off roller arrangement for flat bed knitting machines in accordance with a preferred exemplary embodiment of the present invention.
Figure 4:
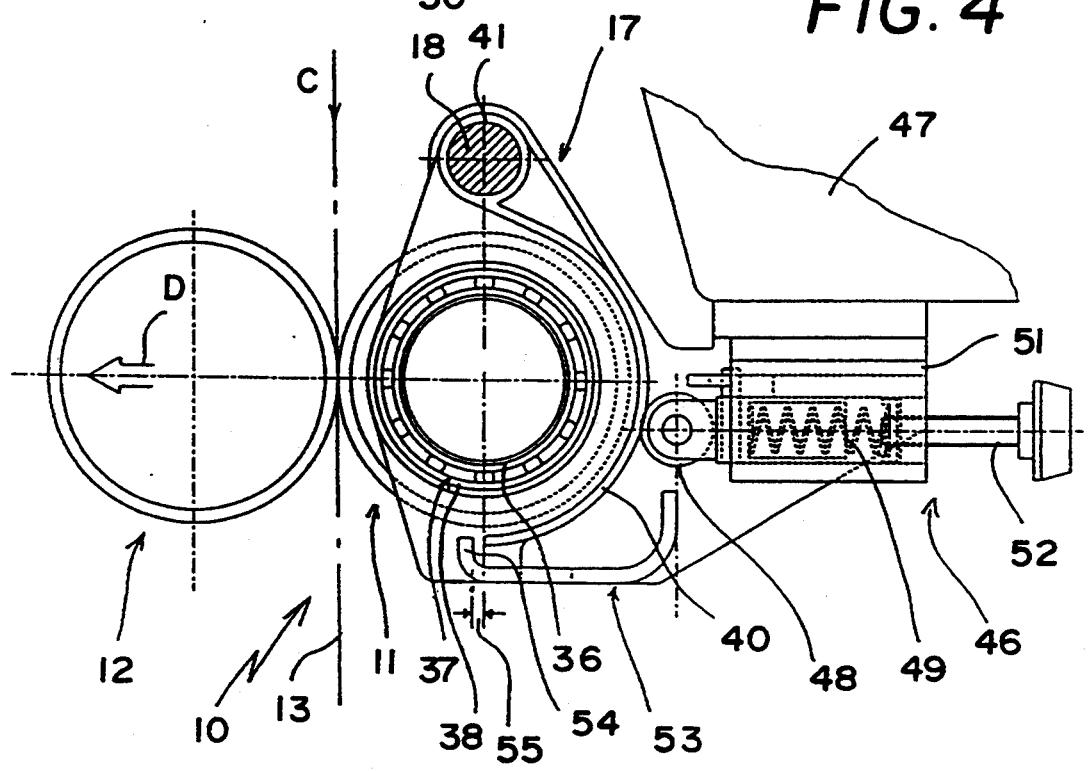
FIG. 4 is a partly broken section corresponding to the sectional representation IV—IV, through a fabric take-off roller arrangement of FIG. 1 that is held on a stationary part of a flat bed knitting machine.

In FIG. 1, the fabric take-off roller arrangement 10, shown here detached from a flat bed knitting machine, has a fabric take-off roller 11 and a parallel counter-roller 12, which practically rest against one another along their circumferences and between which a fabric run 13 in the form of a knit fabric and only shown schematically in FIG. 4 is drawn through from top to bottom, or is taken off of the flat bed knitting machine. For this purpose the take-off roller 11 and the counter-roller 12 are driven by a motor counter to each other in accordance with arrows A and B. A fabric take-off roller arrangement 10 of this type is particularly suited for so-called combers.

Figure 2:
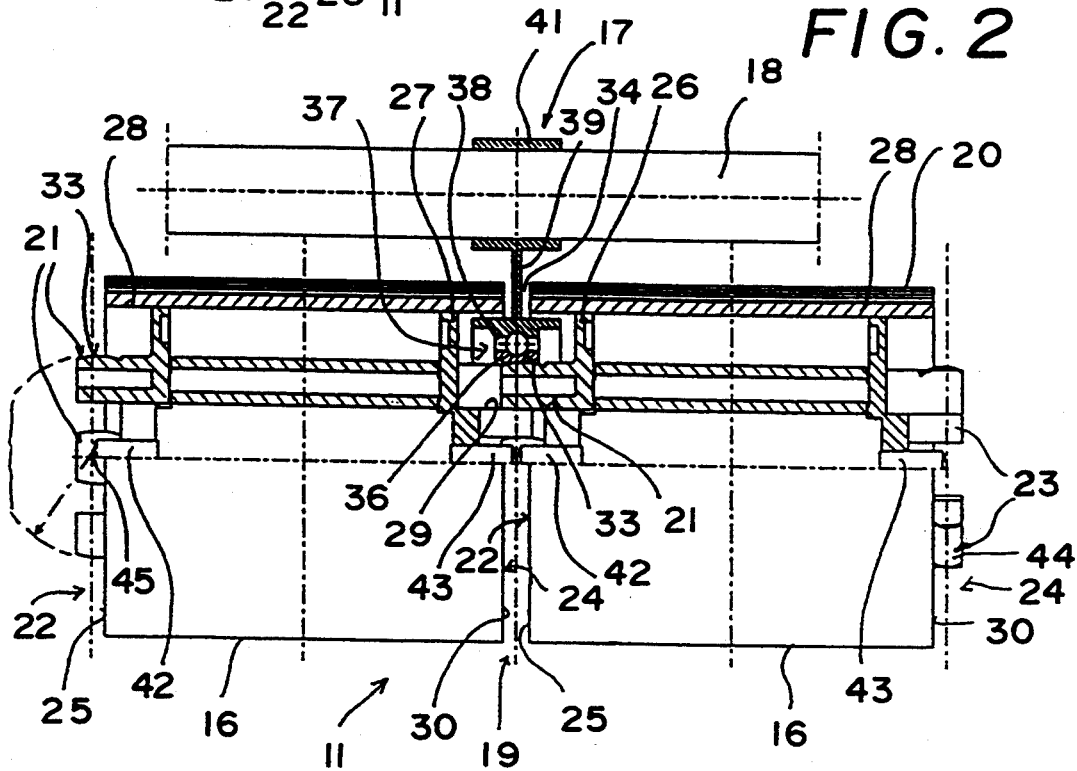
FIG. 2 is a front view, partly in section and broken, in accordance with arrow II of FIG. 1.
Figure 3:
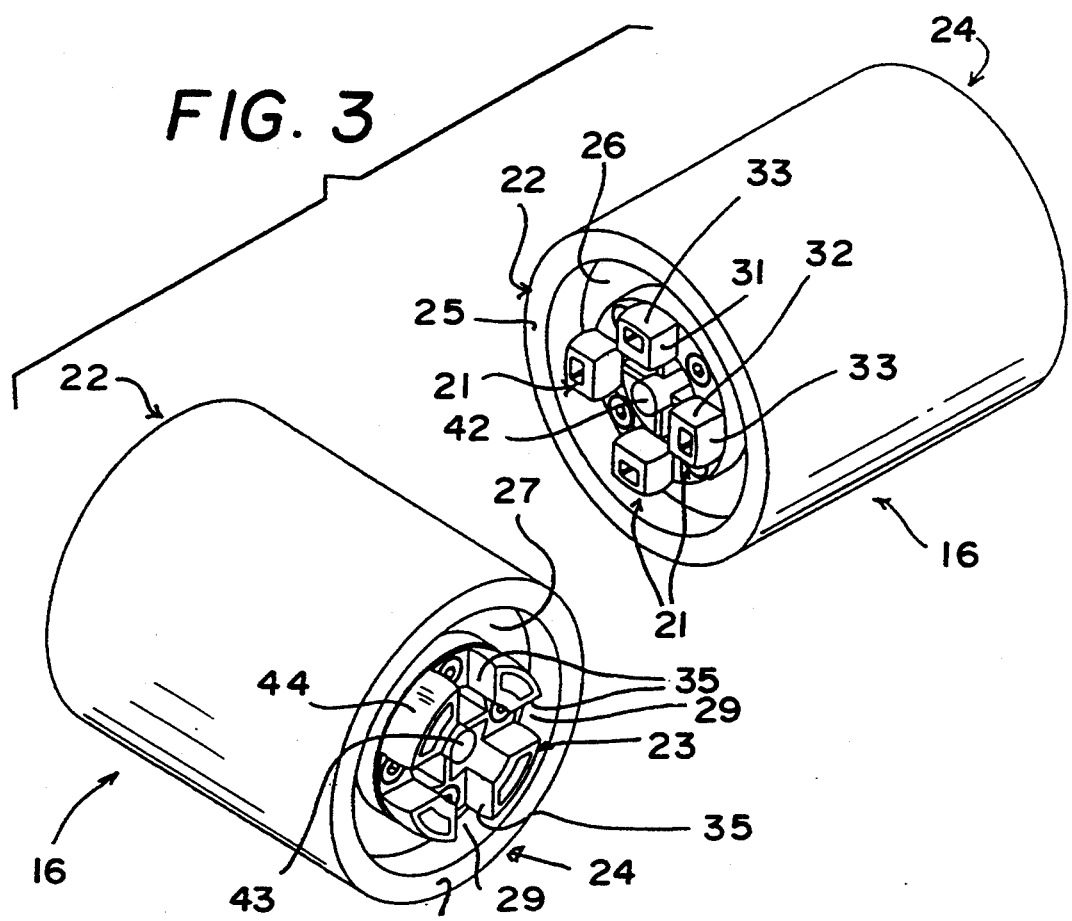
FIG. 3 is a representation in perspective of two roller elements of the fabric take-off roller with their ends joined to one another.

As can be seen from FIGS. 1 through 3, the fabric take-off roller 11 is combined from a plurality of identical roller elements 16 that engage one another in a co-rotating manner at their ends located across from another. The roller elements 16 are pivotably suspended, via a support carrier 17, in each co-rotating region 19 on a shaft embodied rigidly as a round rod 18 on the flat bed knitting machine. The roller elements 16 disposed next to one another are provided at one end 22 with an arrangement of spherical claws 21 that engage side-by-side, and at the other end 24 with counterclaws 23. In the exemplary embodiment shown, four spherical claws 21 that project from an inside disk 26 held inside an outer cylinder casing 28 and recessed with respect to its front 25 are provided at one end 22 of each element 16. The spherical claws 21 protrude beyond the front 25 of the end of the cylinder casing 28. Correspondingly, the same applies for the four counterclaws 23, which project from a likewise recessed inside disk 27 and protrude beyond the respectively other front 30 of the cylinder casing 28, and form indentations 29 between themselves, which are engaged by the spherical claws 21 of the front side 22. The counterclaws 23 are shaped as sections of a circular ring such that the defining walls 35 of the indentations 29 extend parallel and level in the radial direction; their radially outer surfaces 44, however, are embodied spherically in two dimensions. In contrast, the spherical claws 21 are embodied spherically in two dimensions not only on their side surfaces 31, 32, but also on their radially outer surface 33. The cylinder casing 28 is covered by a cover 20 on its circumference.

In the engaged state of two adjacent roller elements 16, in accordance with FIG. 2 the two ends, the front sides 25 and 30 of the cylinder casings 28, are at a specific distance from one another (gap 34), and the spherical claws 21 engage the indentations 29 only over a partial area of their depth. The spherical claws 21 of the roller elements 16 rest with their spherical outer surfaces 33 on the level inner surface of an inner ring 36 of a radial roller bearing, in this instance a radial ball bearing 37. The support carrier 17, in the form of a semicircular ring-shaped, double-T element whose vertical longitudinal rib 39 protrudes outwardly through the gap 34, between the two front sides 25 and 30 of adjacent roller elements 16, is secured to the outer side of the outer ring 38 of the radial ball bearing 37. An outer-side transverse rib 40 of the support carrier 17 is provided at an upper end with a bearing sleeve 41, through which the rigid shaft 18 extends and which is secured to the shaft 18 in the axial direction in a way that is not shown.

It can be seen from this that, in each area 19 of connection of adjacent roller elements 16 to each other and to adjacent roller elements, a flexible seating of the roller elements 16 connected to each other is provided that is secured against relative rotation; a flexible suspension of the roller elements 16 in the support carrier 17 for pivoting the roller elements 16 out of alignment with the longitudinal axis of the fabric take-off roller 11 is also provided by the ball bearing 37 of the support carrier 17, because of the spherical surfaces 31, 32, 33, at least of the spherical claws 21. Respectively one stop pin 42, 43 projects centrally from each inside disk 26 and 27 of the roller elements 16; these stop pins 42, 43 rest against each other with their convex front surfaces and keep the gap 34 of adjacent roller elements 16 constant. As indicated in FIG. 2, the apex 45 of the convex front surface of the stop pins 42, 43 forms the center point of the spherical outer surfaces 33 or 44.

As seen in FIG. 4, the rigid shaft 18 is disposed directly above the imagined longitudinal axis of the fabric take-off roller 11, and the axis of rotation of the two rollers 11 and 12 are disposed in one horizontal plane. It can also be seen from this figure that the semicircular longitudinal rib 39 and the approximately semicircular, outer transverse rib 40 of the support carrier 17 are disposed in the circumferential region of the fabric take-off roller 11 remote from the counter-roller 12. In this circumferential region of the fabric take-off roller that is remote from the counter-roller 12, a clamping device 46 for each roller element 16 is secured, beneath the horizontal center plane of the two rollers 11 and 12, to a stationary needle bed carrier or machine frame 47; this clamping device serves to resiliently press the fabric take-off roller 11 against the rigid counter-roller 12, in the respective connection area 19 of the roller elements. For this purpose each clamping device 46 has a roller 48 that rests against the outer transverse rib 40 of the support carrier 17 and is seated in a housing 51 to be flexibly displaceable via a compression spring 49. The compression spring 49 rests on its end remote from the roller 48 against an adjusting pin 52 that can be screwed into the housing 51, and with which the amount of pressure of each support carrier 17 and hence of the individual roller elements 16 on the counter-roller 12 can be individually selected and adjusted.

The counter-roller 12 has a plurality of roller elements 56 that are rigidly disposed in sequence on a driven shaft. As seen in FIG. 1, in this case the roller elements 56 of the counter-roller 12 are shorter than the roller elements 16 of the fabric take-off roller 11, preferably approximately half as long. The counter-roller 12 is pivotable, in accordance with arrow D, out of the region of the fabric take-off roller 11 in a way that is not described in more detail. To limit a pivoting back of the roller elements 16 of the fabric take-off roller 11 in this case, a sheet metal channel 53 is disposed stationarily beneath the fabric take-off roller 11, against the one arched rib 54 of which the free end of the outer transverse rib 40 of the support carrier 17 located at a slight distance 55 can impact.

The fabric run 13 shown schematically in FIG. 4 is thus taken off from top to bottom by the two driven rollers 11 and 12, in accordance with arrow C. If the fabric run 13 has irregular thickenings, the roller element 16 located in the region of this thickening can yield in that it is deflected with the nearest support carrier(s) 17 counter to the effect of the compression spring 49 of the clamping device 46. Because the connection of the affected roller element 16 to the adjacent roller element, as well as the inside of the support carrier 17 by means of the spherical surfaces 31, 32 or 33, 34 is flexible, the adjacent roller element 16 continues to rest against the affected region of the fabric run 13 that has a thickening, at least along part of its length. During this deflection of a support carrier 17, the affected roller element 16 can move flexibly with the spherical surfaces 31, 32 of the claws 21 with respect to the counterclaws 23 of the adjacent roller element 16, and with the spherical outer surfaces 33, 44 of the claws 21 and counterclaws 23 with respect to the level inside surface of the inner ring 36 of the ball bearing 37.

What is claimed is:

1. A fabric take-off roller arrangement, comprising:
   two take-off rollers arranged in parallel;
   a support shaft;
   a plurality of support carriers pivotably mounted to said support shaft for rotatably supporting one of said take-off rollers; and
   pressing means for engaging and pressing one of said take-off rollers against the other of said take-off rollers, wherein:
   at least one of said take-off rollers comprises a plurality of roller elements disposed next to each other in the axial direction, each roller element having engagement means at their axial ends for flexible engagement of the roller elements for mutual rotation,
   said plurality of support carriers are each pivotably held in a direction that is perpendicular to the orientation of said roller elements,
   said roller elements are pressed individually by said pressing means against the other of said take-off rollers,
   a fabric run to be taken off is guided tangentially between said two parallel arranged take-off rollers, and
   said plurality of support carriers are provided, one for each roller element.

2. The fabric take-off roller arrangement as defined in claim 1, wherein:
   each roller element has axial ends;
   the engagement means at the axial ends of each roller element comprise claws, with the claws of adjacent end facing roller elements adopted to engage each other and be next to each other, with the claws of one of the engaged adjacent roller elements being two-dimensionally spherical at least on those surfaces adjacent to the claws of the other engaged adjacent roller element.

3. The fabric take-off roller arrangement as defined in claim 2, wherein:
   at least one of said plurality of support carriers includes a receptacle against which the two-dimensionally spherical surfaces rest.

4. The fabric take-off roller arrangement as defined in claims 1, wherein:
   each roller element has a center and each roller element defines a longitudinal stop at said center.

5. The fabric take-off roller arrangement as defined in claim 1, wherein:
   at least one of said plurality of support carriers is provided with a radial roller bearing for each roller element, said roller bearings being disposed inside of a respective roller element, and defining an inner ring which receives the ends of adjacent respective roller elements.

6. The fabric take-off roller arrangement as defined in claim 6, wherein:
   at least one of said plurality of support carriers is provided with an approximately semicircular disk for each radial roller bearing, which is securely connected at one end to a bearing sleeve and at its other end to the outer ring of its respective radial roller bearing, each approximately semicircular disk extending through a gap formed between adjacent roller elements.

7. The fabric take-off roller arrangement as defined in claim 1, wherein:
   said pressing means includes an adjustable clamping nut for adjusting the pressing force applied to at least one of said plurality of support carriers.

8. The fabric take-off roller arrangement as defined in claim 1, wherein:
   the other of said take-off rollers comprises at least one counter-roller mounted to pivot away from the other of said at least one of said take-off rollers.

9. The fabric take-off roller arrangement as defined in claim 1, further comprising:
   a stationary stop located opposite at least one of said plurality of support carriers.

* * * * *